United States Patent [19]

Hill

[11] 3,882,568
[45] May 13, 1975

[54] MOVIE FILM CLEANING SYSTEM
[76] Inventor: George P. Hill, 11525 Fourth Ave., N.W., Seattle, Wash. 98177
[22] Filed: Aug. 20, 1973
[21] Appl. No.: 389,571

[52] U.S. Cl. .................. 15/308; 15/77; 15/100; 15/306 A
[51] Int. Cl. ............................................ A47l 5/38
[58] Field of Search .......... 15/77, 306 A, 308, 309, 15/100

[56] References Cited
UNITED STATES PATENTS
| | | | |
|---|---|---|---|
| 1,089,453 | 3/1914 | Wood | 15/308 X |
| 1,926,981 | 9/1933 | Gould, Jr. | 15/308 X |
| 2,015,583 | 9/1935 | Bartsch | 15/308 |
| 2,358,334 | 9/1944 | Knowlton | 15/308 X |
| 3,546,733 | 12/1970 | Johnson | 15/308 |

*Primary Examiner*—Billy J. Wilhite
*Assistant Examiner*—C. K. Moore
*Attorney, Agent, or Firm*—Seed, Berry, Vernon & Baynham

[57] ABSTRACT

A device is provided for cleaning movie film and the like of particles adhering thereto as by electrostatic attraction. The particles are dislodged by action of opposed rotary brushes and transverse and longitudinal air streams drawn by suction into a vacuum plenum divided by the film and in which the brushes are located.

4 Claims, 3 Drawing Figures

PATENTED MAY 13 1975

3,882,568

MOVIE FILM CLEANING SYSTEM

BACKGROUND OF THE INVENTION

This invention relates to the cleaning of motion picture film, film strips, and other information-carrying webs and the like such as magnetic audio, video and computer tapes.

Due primarily to static electricity, dust, lint and small grit adhere to the flat surfaces of movie film, magnetic tapes and the like. In the case of movie films and film strips these foreign materials show in the projected picture as an irritating flicker. The principal object of this invention is to provide an improved, practical system for removing such foreign materials.

Some film manufacturers recommend that movie films be cleaned by drawing them through soft, lintless cloths moistened with a cleaning solvent such as methyl chloroform. Sometimes a lubricant is applied at the same time. Cleaning cloths which have been recommended for this purpose are a good grade of Canton flannel, a short or medium-pile rayon or nylon plush, or a soft cotton batiste. The normal procedure has been to rewind the film onto a take-up reel while drawing it between two solvent-moistened cloths which are lightly manually pressed against the opposite faces of the film with one hand. This operation must be performed slowly enough to permit the cleaning solvent to evaporate completely before the film reaches the take-up reel.

It is necessary to refold the cleaning cloths often so that only clean areas will contact the film. Otherwise, the film will be scratched by the accumulated dirt particles. Also, frequent remoistening of the cloths is necessary because the solvent evaporates rapidly. The film manufacturers recommend that whenever the film is stopped to refold the cloths and/or apply more cleaning solvent, the film should be backed up a foot or so before resuming the cleaning operation.

An alternative procedure to manually applying the solvent and pressing the cleaning cloths against the film has been to use a pair of spring-loaded jaws between which cleaning cloths are introduced from a storage roll. The solvent is continuously supplied to the cloth between the jaws through jaw openings from a feed bottle via a flexible tube and adjustable flow control valve. As dirt accumulates on the cloths they are withdrawn from the jaws and replenished from the storage roll. The film is drawn between the jaws at right angles to the cloth feed.

The foregoing methods of using cleaning cloths and solvent have a serious drawback. If a piece of grit from the film is trapped by the cleaning cloth, it will often make a continuous scratch on the film. The utmost care in frequently shaking the cloth and/or providing a fresh cloth surface will not prevent some longitudinal scratching of the film. Such longitudinal scratches are highly visible when the film is projected.

Respecting various prior art patents, the use of a pulsating vacuum within a chamber having a plurality of upper transverse slots with scraping edges over which information-carrying tape is passed to be cleaned by the vacuum and the scraping action of the scraping edges is disclosed in Foret U.S. Pat. No. 3,620,230. The teachings of Wollman U.S. Pat. No. 3,420,710 indicate that a film base web can be freed of foreign particles adhering thereto as the result of an electrostatic bond by exposing the web surface to a shock wave created by air directed against such surface at ultrasonic speed to dislodge the particles, and then removing the dislodged particles by vacuuming. It is also known in the art to use a compressed air blast in combination with suction removal means.

U.S. Pat. No. 3,531,201 to Prentice discloses a system for cleaning developed negative and raw positive film stock of surface contaminants prior to their combination for use in a contact printer. In this system the film stock passes first between radioactive ionizers to create a static electric charge on the film surfaces and thereby induce mutually repelling forces in the film and the contaminants. The released contaminants are swept transversely across the film by high velocity air caused by a vacuum source. The film continues between a pair of opposed non-rotary brushes whose bristles are maintained in a state of agitation by the high velocity air to "scrub" the film surface and thereby attempt to remove any contaminants not released by the static charge.

The present invention aims to effectively clean motion picture film without the use of ionizers or scrapers, without the need of vibrating or undulating the film, and without subjecting the film to blasts of compressed air or air at ultrasonic velocity. More particularly, important objects of the invention are to provide an effective film cleaning apparatus which is of simple, compact, and economical construction, safe to be used in the home by an "amateur" photographer, will not damage film, is substantially trouble-free in operation and can be easily maintained.

Although the invention was developed primarily to clean movie film or film strips, the invention is not limited to that use and is applicable to the cleaning of other information-carrying webs such as video, audio and computer tapes. It has become increasingly important to keep computer tapes free of dust and other foreign particles which can create transmission error.

SUMMARY OF THE INVENTION

In accordance with the present invention, the film to be cleaned is simultaneously brushed and vacuumed on both sides while traveling along a defined path. The foreign material is freed from the film primarily by the brushing action and is carried away by the vacuum action. Streams of air drawn by the vacuum travel over the film, both longitudinally and laterally of the film, in the areas being brushed and assist in the removal of the foreign material. The brushing action is performed by a pair of opposed rotary brushes which are housed in vacuum chambers separated by the film while it is guided at its side edge portions in guide grooves interrupted near the brushes to permit the transverse inflow of air to the vacuum chambers. Inflowing air streams also occur between the guide grooves at both ends of the vacuum chambers.

BRIEF DESCRIPTION OF THE DRAWINGS

The above and other objects, features and advantages of the present invention will be better understood from the following detailed description with reference to the drawings in which.

DESCRIPTION OF PREFERRED EMBODIMENT

Figure 1:
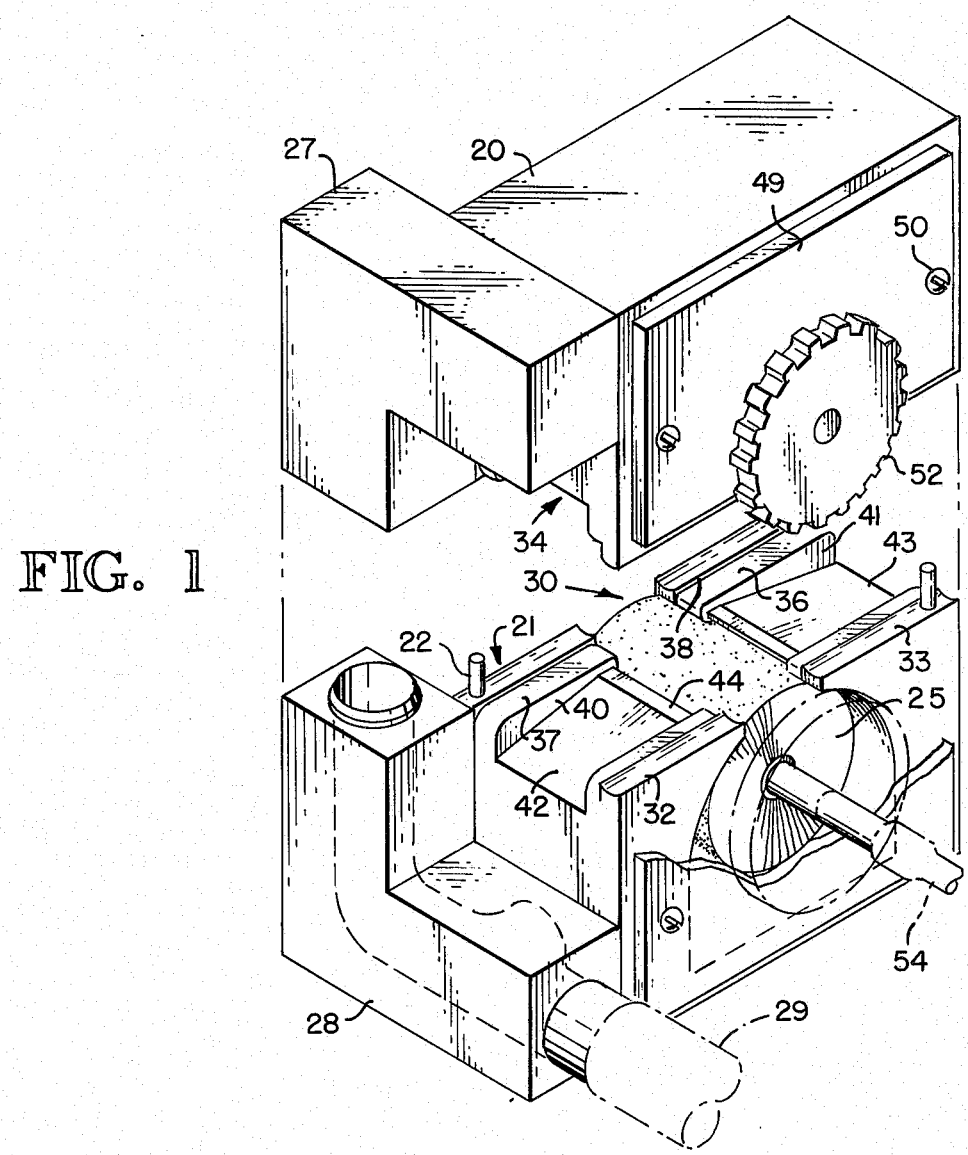
FIG. 1 is a perspective view with parts broken away showing the upper and lower housings separated for insertion of a film to be cleaned.

Referring to the drawings it is seen that the film cleaning assembly of the invention has mating upper and lower opposed housings 20–21 which are basically the same, and hence like identifying numerals have been applied to corresponding parts thereof. These housings interfit as by dowels 22, or may be hinged together, so that they function as a unit and yet can readily be separated for insertion of the movie film to be cleaned.

The housings have vacuum chambers 23 which are exposed to one another at the center of the assembly and contain upper and lower brushes 24–25. Each of the vacuum chambers has a suction port 26 connecting with a two part suction manifold 27–28 which interconnects the vacuum chambers with a suction line 29 leading to a suitable vacuum source. The manifold has its two parts 27–28 fixed to respective housings 20–21 and interfitted at the center in such a manner as to separate when the housings are separated for film insertion.

Air intake to the vacuum chambers occurs at the front and back and at both sides of the assembly at the meeting of the two housings. The side intakes 30 are formed between pairs of front and rear outer meeting faces 32–33 which contact their opposing faces of the other housing when the housings are together in operative position. The front and rear intakes 34–35 are located between laterally spaced film guide grooves formed by a pair of rear guide faces 36 and a pair of front guide faces 37 on each housing which are recessed at shoulders 38 from respective of the meeting faces 32–33. At their inner side edges these faces 36 and 37 join respective walls of front and rear pairs of recessed side walls 40–41 between which are located front and rear sloped air intake channel faces 42–43. These sloped faces merge at the inside of the housings with respective horizontal faces 44 stepped from the inner ends of the guide faces 36–37 to form vertically thin laterally-extending front and rear air intake ports above and below the film at the inner ends of the intakes 34–35. The vertical extent of the side air intakes 30 exceeds the vertical width of the film guide grooves so that the outer edge portions of the film outwardly of the lateral extent of the front and back air intake ports, will always be subjected, top and bottom, with intake air streams.

By the described air intake arrangement it will be appreciated that a film passing through the unit will have all of its surface subjected to rapidly moving air streams in the cleaning zone in which the brushes 24–25 operate, and that because the film divides the intake passages in half, there are eight air intake streams, four to each vacuum chamber 23 when the cleaning system is in operation. It is preferred to have the cleaning brushes 24–25 extend laterally of the assembly at least the width between the film guide shoulders 38 so that the entire width of the film will be subjected to the action of the brushes as well as of the air streams.

The shafts 46–47 for the brushes are journaled at their ends in left and right pairs of side plates 48–49 which cover the lateral sides of the vacuum chambers 23 and define the top and bottom edges of the side air intakes 30. The central portion of each shaft may be squared to provide a driving fit with the brush nubs and yet permit easy endwise removal of the brushes for wear replacement. To permit such removal at least one set of the side plates is screw-mounted at 50 to the housings so that they can be removed and free the respective end of the shafts.

At one side of the housing assembly the brush shafts 46–47 project endwise beyond the respective side plates and receive a pair of meshing gears 52–53. The lower shaft has a drive connection 54 from an electric motor or other suitable power source. It will be noted that this drive arrangement does not interfere with lifting of the upper housing such as to permit film insertion.

The cleaning brushes 24–25 should have very soft bristles, but preferably stiffer than camel's hair. Although not preferred, I have successfully used nylon velvet cemented to a roller in place of a bristle brush, and so, the term "brush" when used in this description and the annexed claims is intended to have a scope commensurate with such a rotary cleaning device. The important thing is that the brush be capable of dislodging dust, lint and small grit particles from the film without scratching or otherwise damaging it.

It will be noted that the bristles on each brush are flexed once each revolution responsive to contact of the bristles with the film. This flexing in conjunction with the suction in the vacuum chambers and the centrifugal force due to the rapid spinning of the brushes makes it impossible for the brushes to pick up and retain any grit.

A standard home vaccum cleaner may be used as the suction means for the vacuum chambers 23. In such a case an adapter-reducer is used to connect the suction hose of the vacuum cleaner to the hose 29. It is also possible to mount the cleaning unit of the present invention on a movie projector and use the projector cooling blower system as a suction source. In such a case the brushes 24–25 may be powered by a flexible drive takeoff from the projector drive system.

Figure 2:
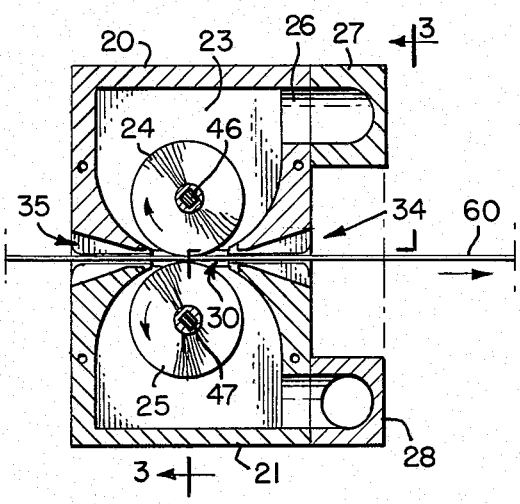
FIG. 2 is a longitudinal vertical sectional with the housings assembled together and taken as indicated by line 2—2 in FIG. 3.
Figure 3:
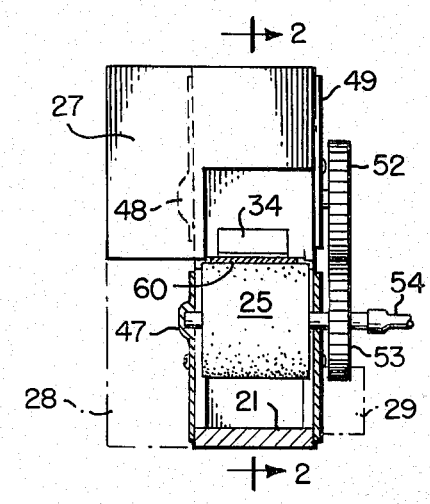
FIG. 3 is an elevational view with the housings assembled together and with the lower housing shown in transverse vertical cross-section as indicated at 3—3 in FIG. 2.

During operation of the described cleaning system the film 60 to be cleaned is inserted with the housings 20–21 separated as in FIG. 1, and then the housings are aligned by the dowels 22 and brought together with the gears 52–53 in mesh. The film takeup reel, the brush drive motor, and the vacuum source are then activated. As indicated in FIG. 2, the brushes 24–25 are preferably driven in opposition to the film advance direction. The transverse air streams 30—30 and the longitudinal air streams 34–35 act in concert with the brushes to dislodge foreign particles from both faces of the film. Then these air streams carry the dislodged particles into the chambers 23 from which they are then substantially discharged by the suction source to a collection bag or filter.

What is claimed is:

1. A cleaning device for movie film and the like comprising:
   a housing assembly providing a vacuum plenum,
   guide means for guiding the film endwise through the plenum such that the film divides the plenum into two vacuum chambers, said guide means comprising a front pair of guide grooves separated from one another by a front air intake and a rear pair of guide grooves aligned with the front pair and separated from one another by a rear air intake, said front pair being separated from said rear pair by a pair of side air intakes, said front, rear and side air intakes having a restricted height arranged to be divided by said film such that each of said chambers is served by respective front rear and side restriction air intakes, a pair of opposed rotary brush means journal-mounted in said chambers and arranged and adapted to dislodge foreign particles from both faces of the film across the full width thereof, and suction means connected to said chambers for drawing air into said chambers through all of said air intakes simultaneously whereby air circulates over the side edges and entire surface of the film in the vicinity of the brush means.

2. Apparatus according to claim 1 in which said housing assembly is separable at the level of said guide grooves into two housings adapted to be moved relative to one another for insertion of a film, each of said housings having one of said brush means journal-mounted therein and a respective drive component arranged to interact with the drive component of the other said housing, said drive components being arranged to separate from one another when the housings are separated.

3. A cleaning device for movie film and the like, comprising:

a housing assembly, guide means in the housing assembly for guiding the side edge portions of a film along a given linear travel path, said path having an intermediate cleaning zone within the housing assembly in which said side edge portions are exposed, a pair of opposed rotary brushes in said zone extending transversely for the full width of said path and arranged to brush the opposite faces of a film moving longitudinally along said path and dislodge foreign particles on said faces, a pair of air intake jets spaced apart by said brushes along the length of said film and directing air streams along said film at points where said brushes act on said film, a pair of air intake ports spaced apart by said brushes by the width of said film and directing air streams along said film at points where said brushes act on said film, and suction means acting in said zone for drawing air through said intake jets and said intake ports and for conveying away the particles dislodged from the film by said brushes.

4. Apparatus according to claim 3 in which each of said air streams is bisected by said film, thereby causing air to flow on each surface of said film.

* * * * *